United States Patent [19]

Hara et al.

[11] Patent Number: 4,660,988
[45] Date of Patent: Apr. 28, 1987

[54] STIRRING DEVICE FOR LIQUID MATERIAL
[75] Inventors: Noboru Hara, Ichinomiya; Syogo Sugiyama, Gifu, both of Japan
[73] Assignee: Toyoda Gosei Co., Ltd., Nishikasugai, Japan
[21] Appl. No.: 783,074
[22] Filed: Oct. 2, 1985
[30] Foreign Application Priority Data
  Oct. 2, 1984 [JP] Japan ............................ 59-149440[U]
[51] Int. Cl.$^4$ ............................................. B01F 15/02
[52] U.S. Cl. ....................................... 366/137; 366/76; 366/98; 366/107; 366/165
[58] Field of Search ..................... 366/136, 137, 76, 77, 366/92–94, 96–98, 101, 102, 107, 131, 136, 137, 165, 279

[56] References Cited
U.S. PATENT DOCUMENTS
1,493,987  5/1924  Kenney ............................ 366/137 X
4,332,483  6/1982  Hope et al. ...................... 366/137 X Primary Examiner—Timothy F. Simone
Attorney, Agent, or Firm—Cushman, Darby & Cushman

[57] ABSTRACT

In a stirring device of liquid material, of circulation type comprising a return pipe inserted in a stirring tank, and a feeding pipe connected to bottom portion of the stirring tank, so that the liquid material fed through the feeding pipe is returned to the return pipe, an expanded part having inner diameter larger than that of the return pipe is provided at top end of the return pipe, and plurality of holes having the total opening diameter larger than the lateral sectional area of the return pipe are bored on both sides of outer circumferential portion of the expanded part. Two reverse circulation streams in the horizontal direction are formed within the circulation tank, and the liquid material is circulated through the feeding pipe and the return pipe, thereby the stirring is performed well without involving the excessive air.

3 Claims, 5 Drawing Figures

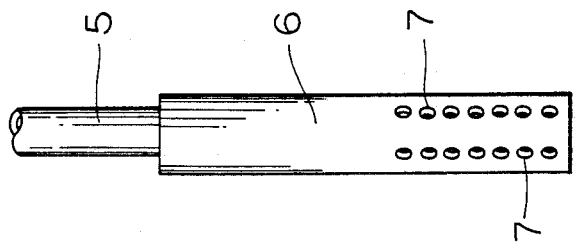
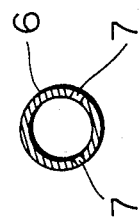
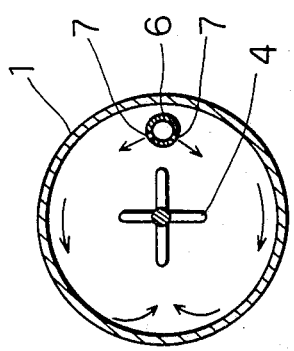

STIRRING DEVICE FOR LIQUID MATERIAL

BACKGROUND OF THE INVENTION

The present invention relates to a stirring device for liquid material, which circulates and stirs liquid material such as plastic material. More specifically, the invention relates to a stirring device wherein a return pipe (i.e. an outlet pipe) is inserted in a stirring tank and a feeding pipe (i.e. an inlet pipe) is connected to bottom portion of the stirring tank so that liquid material withdrawn from the stirring tank through the feeding pipe is returned to the stirring tank via the return pipe.

In a molding device to mold foamed polyurethane products, for example, polyol and isocyanate are put in separate stirring devices and then stirred while circulated between the stirring device and an injection device respectively. Such a stirring device of the prior art, used in a plastic molding device, as shown in FIG. 1 comprises a stirring tank 21, a stirring blade 22 driven to rotate at the center within the stirring tank 21, a return pipe 23 inserted in the stirring tank 21 from above for introducing a circulated liquid material into the tank, and a feeding pipe 24 connected to the bottom portion of the stirring tank 21, so that the upper opening of the stirring tank 21 is sealed, a pressure air pipe (not shown) is connected to the upper side and the stirring is performed under pressure in the stirring tank 21.

In this construction, however, since the return pipe 23 with its opening end directed downward is arranged in the stirring tank 21 and the liquid material of large flow rate flows towards the bottom portion of the stirring tank 21a, large convection in the vertical direction is produced within the stirring tank 21 and the liquid surface is swollen significantly, whereby the air content in the liquid material starting material for the foamed polyurethane becomes excessive and cannot be controlled suitably.

SUMMARY OF THE INVENTION

An object of the invention is to provide a stirring device for liquid material, which can suppress incorporating excessive air and stir the liquid material well.

A stirring device for liquid material according to the invention is a stirring device a circulation type, comprising a return pipe inserted in a stirring tank, and a feeding pipe connected to the bottom portion of the stirring tank, so that the liquid material withdrawn through the feeding pipe is returned via the return pipe, wherein top end of the return pipe is provided with an expanded part having an inner diameter larger than that of the return pipe, and the expanded part is provided with plurality of holes bored on both sides of outer circumferential portion thereof, these holes having a total opening area larger than the lateral cross-sectional area of the return pipe.

In this construction, the liquid material flowing through the return pipe and the expanded part into the stirring tank produces two circulation streams in the horizontal direction within the stirring tank and is stirred well without incorporating air excessively.

BRIEF DESCRIPTION OF THE DRAWINGS

FIG. 3 is a front view of a nozzle pipe;

FIG. 4 is a lateral sectional view of the nozzle pipe; and

FIG. 5 is a lateral sectional view of a stirring tank.

DESCRIPTION OF THE PREFERRED EMBODIMENTS

Figure 1:
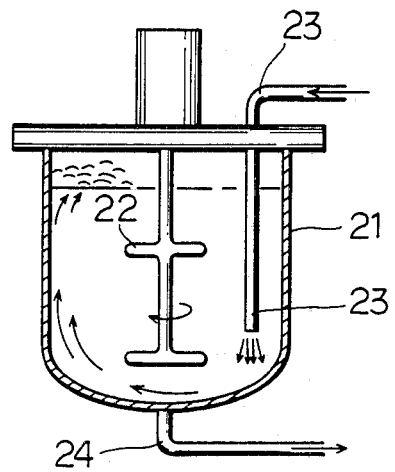
FIG. 1 is a sectional view of a stirring device in the prior art.
Figure 2:
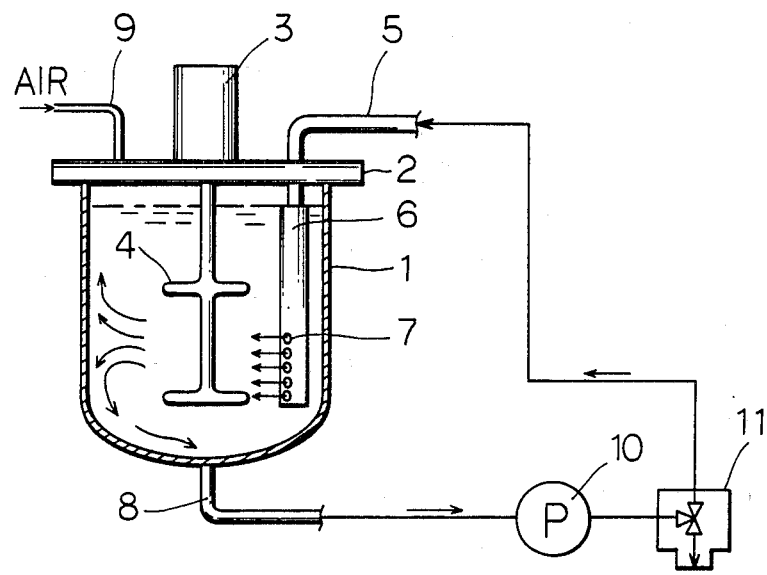
FIG. 2 is sectional view of a stirring device of an embodiment of the invention.

FIG. 2 shows a stirring device of circulation type, which stirs liquid material such as polyol or isocyanate in a plastic molding device. Reference numeral 1 designates a stirring tank to stir the liquid material. The upper end of the stirring tank 1 is sealed by a cover 2 and a rotational drive device 3 is installed on the cover 2. A stirring blade 4 connected to the rotational drive device 3 is suspended therefrom within the stirring tank 1. Numeral 5 designates a return pipe connected so that the liquid material fed from an injector head 11 is returned into the stirring tank 1. The return pipe 5 penetrates the cover 2 and is inserted in the stirring tank 1 from upper end, and top end of the return pipe 5 is provided with a nozzle pipe 6 of hollow cylinder shape having a closed bottom end, as an expanded part connected the return pipe 5. The nozzle pipe 6 has an inner diameter which is larger than that of the return pipe 5. The nozzle pipe 6 is provided with a plurality of nozzle holes 7 bored in vertical alignment on both sides of (i.e. which are nearly diametrically opposed to one another on) the outer circumferential sidewall of the pipe 6. The total opening area of the nozzle holes 7 is arranged so as to be larger than the transverse cross sectional area of the return pipe 5 so that the flow rate of the liquid material fed through the return pipe 5 to the nozzle tube 6 does not increase during jetting through the nozzle holes 7. The directions of the nozzle holes 7 formed in two vertical lines on both sides of the nozzle pipe 6 are arranged so to be aimed nearly tangential to the inner wall of the stirring tank 1, and the angle of the nozzle holes 7 of both sides in the horizontal plane may be made 90~270 degrees for example, so that the liquid material jetted through the nozzle holes 7 of both sides is circulated in both horizontal directions along the inner wall of the stirring tank 1 as shown in FIG. 5. The other end of the return pipe 5 is connected to the injector head 11. The other end of the feeding pipe 8, i.e. from the end which is connected to the bottom portion of the stirring tank 1, is connected to the inlet side of a pump 10, and the outlet side of the pump 10 is connected to the injector head 11.

A changing valve in the injector head 11 regulates whether the liquid material is returned from the pump 10 to the return pipe 5 or it is mixed with other liquid within the injector head 11 and injected into a mold (not shown). Pressurized air is applied to the head space at the upper end of the stirring tank 1 by an air pipe 9.

The operation of the stirring device in above-mentioned construction will now be described. The changing valve of the injector head 11 is normally changed in such state that the liquid material is circulated except for during the injecting step. The liquid material such as polyol or isocyanate in the stirring tank 1 is fed through the feeding pipe 8 to the return pipe 5 by the action of the pump 10 and returned through the nozzle pipe 6 to the stirring tank 1. Then the liquid material jetted through the nozzle holes 7 of the nozzle pipe 6 produces two reverse circulation streams in a horizontal plane along the inner wall of the stirring tank 1 as shown in FIG. 5, and is stirred well together by the stirring action of the stirring blade 4 being rotated, whereby the constituency of the liquid material is made uniform. Since the inner diameter of the nozzle pipe 6 is made larger and the total opening area of the nozzle holes 7 is larger than the transverse cross sectional area of the return pipe, the flow rate during jetting of the liquid into the stirring tank 1 is not increased at the outlet of the nozzle holes. Furthermore, since the circulation stream in the stirring tank is not formed in a vertical direction but in the horizontal direction, the liquid material is not swollen on the horizontal surface, thereby incorporation of excessive air in the liquid material is prevented and the air content in the material can be controlled suitably. The liquid material in the stirring tank 1 passes through the pump 10 and is entered in the injector head 11 when the valve of the injector head 11 is changed, and it is mixed with other liquid material and injected into the mold.

Although the stirring blade 4 is installed within the stirring tank 1 in the above embodiment, the stirring blade 4 may be omitted if the liquid can be stirred well by stirring according to the circulation stream. Although the nozzle tube 6 as expanded is provided at the top end of the return pipe, the nozzle pipe as separate member need not be provided if the top end of the return pipe is made an expanded part by machining.

According to the stirring device for liquid material of the invention as above described, circulation streams in the vertical direction are not produced in the liquid material within the stirring tank, but two reverse circulation streams in the horizontal direction are produced, and the liquid material flows in the stirring tank at lower flow rate by means of the expanded part and then stirred, thereby the liquid material is not swollen on the horizontal surface as in the case of the circulation stream in the vertical direction and incorporation of excessive air into the liquid material is prevented and the air content in the liquid material can be controlled suitably. Furthermore, since the two reverse circulation streams in the horizontal direction are formed within the stirring tank and stirring of a circulation type is performed, the stirring can be performed well and the constituency of the liquid material be made to be uniform as well.

What is claimed is:

1. A device for stirring a liquid, comprising:
a stirring tank adapted to contain a liquid while that liquid is being stirred;
a circulation loop comprising a feeding pipe having inlet means in said tank, a return pipe having an outlet means in said tank, and conduit means connecting said feeding pipe with said return pipe and incorporating pumping means for circulating liquid around said circulation loop so that the liquid being stirred is introduced into said tank by said return pipe through said outlet means thereof, is withdrawn from said tank by said feeding pipe through said inlet means, and passed to said feeding pipe to said return pipe via said conduit means;
said stirring tank having a bottom and an upstanding peripheral sidewall of generally circular horizontal transverse cross-sectional shape, said inlet means of said feeding pipe being disposed in said tank near said bottom;
said outlet means of said return pipe being a vertically elongated, tubular member stationarily disposed in said tank near said peripheral sidewall;
said outlet means having two columns of outlet openings respectively aimed in clockwise and counterclockwise tangential directions relative to said peripheral sidewall and said outlet means being substantially free of outlet openings aimed in other directions than said clockwise and counterclockwise tangential directions;
said outlet means being larger in diameter than is said return pipe upstream of said outlet means; and
said outlet openings, in sum, being larger in total transverse cross-sectional area than said return pipe upstream of said outlet means.

2. The stirring device of claim 1, wherein:
said outlet means has an upper end and said return pipe is connected to said outlet means at said upper end of said outlet means.

3. The stirring device of claim 1, further including:
a stirring blade disposed for liquid stirring movement in said tank; and
means for moving said stirring blade for moving the liquid which is being stirred.

* * * * *